May 8, 1951     H. H. HALL     2,551,597
RECORDING APPARATUS FOR HIGH-SPEED PHOTOGRAPHY
Filed Aug. 22, 1946     5 Sheets-Sheet 1

Inventor
H. H. Hall
By
M. O. Hayes
Attorney

May 8, 1951 H. H. HALL 2,551,597
RECORDING APPARATUS FOR HIGH-SPEED PHOTOGRAPHY
Filed Aug. 22, 1946 5 Sheets-Sheet 4

Inventor
*H. H. Hall*
By
*M. O. Hayes*
Attorney

May 8, 1951 H. H. HALL 2,551,597
RECORDING APPARATUS FOR HIGH-SPEED PHOTOGRAPHY
Filed Aug. 22, 1946 5 Sheets-Sheet 5

Inventor
H. H. Hall
By M. O. Hayes
Attorney

Patented May 8, 1951

2,551,597

UNITED STATES PATENT OFFICE 2,551,597

RECORDING APPARATUS FOR HIGH-SPEED PHOTOGRAPHY

Harry H. Hall, United States Navy, Durham, N. H.

Application August 22, 1946, Serial No. 692,157

11 Claims. (Cl. 346—110)

(Granted under the act of March 3, 1883, as amended April 30, 1928; 370 O. G. 757)

This invention relates to a method and apparatus for measuring a transient signal and, more specifically, to a method of measuring the shape and duration of the signal, and to a revolving drum camera suitable for use therewith and adapted to record the signal. More specifically, the invention contemplates a drum revolving at predetermined speed and carrying thereon a sensitive film, with a pair of lenses associated therewith, one of the lenses acting to focus on the film primary images of objects which it is desired to photograph, the other lens focusing light waves from a desired light source on the film, thereby to provide secondary images consisting of marking, indexing, or timing lines on the film.

One of the objects of the invention is to provide new and improved photographic means for recording images of very brief duration.

Another object is to provide revolving drum camera apparatus suitable for use in recording the trace of a cathode ray oscilloscope.

Another object is to provide new and improved dual lens means for focusing onto a film images of an object and simultaneously a plurality of marking or indexing lines.

Another object is to provide a new and improved shutter for a camera having a detachable hood in which means controlled by the hood are provided to prevent inadvertent opening of the shutter when the camera is detached from the hood.

Still another object is to provide new and improved means including a swivelling retaining bolt for attaching the body of the camera to the hood.

A further object is to provide new and improved adjustable means for securing a drum to a revolvable shaft in a predetermined fixed position with respect thereto.

Another object is to provide a method of measuring the duration and shape of an electrical or visual transient.

A still further object is to provide a cover for the camera chamber having new and improved latching means.

A still further object is to provide new and improved solenoid actuated shutter means.

Still a further object is to provide a new and improved drum having novel means for holding the film thereon.

Other objects, advantages, and improvements not specifically set forth hereinbefore will be apparent upon a consideration of the following description taken in connection with the accompanying drawings, in which.

Figure 1:
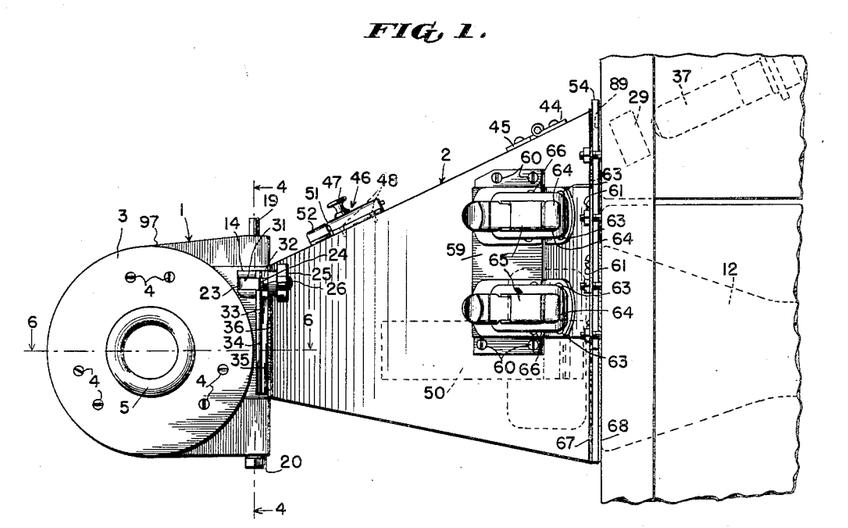
Fig. 1 is a general side elevational view showing the camera mounted upon a hood suitable for use with a cathode ray oscilloscope.

Referring now to the drawings, in which like numerals are used throughout to designate like parts throughout the several views, and more particularly to Fig. 1 thereof, the camera having the general designation 1 is shown as it may be used in one application of the invention, that is, to record and measure transients by the use of a cathode ray oscilloscope 12.

The camera 1 is detachably mounted upon a hood composed of opaque material, the hood having the general designation 2, and which is adapted to enclose the space between a lens, hereafter to be described, of camera 1, and the cathode ray tube 12, thereby to prevent undesired light from reaching the film and obliterating the image to be recorded thereon. The camera 1 is seen, Fig. 2, to have a pair of bosses 13 and 14 extending from the sides thereof, the boss 13 having fixed therein the shank of a bolt 15 having a threaded end 16, and having fixed thereon adjacent the boss the spacer washer 17, the bolt being adapted to pass through a slot in a boss 27 fixed to a face plate 35 fixed to the hood 2, the nut 18 in threaded engagement with the bolt 15 being adapted, when the nut is turned sufficiently, to hold the boss 27 firmly against the spacer washer 17.

The boss 14, on the opposite side of the camera from boss 13, has a slot 31 therein for receiving the swivel head 23 of a bolt 21, the pin 22 passing through the boss and swivel head, the swivel head having an extended shoulder 24 adapted to receive a boss 28 fixed to the face plate 35 of hood 2, the bolt 21 passing through the slot 32 in boss 28, the bolt 21 having a threaded end 26 adapted to receive lock nut 25 for holding boss 28 firmly against the shoulder 24.

Figure 3:
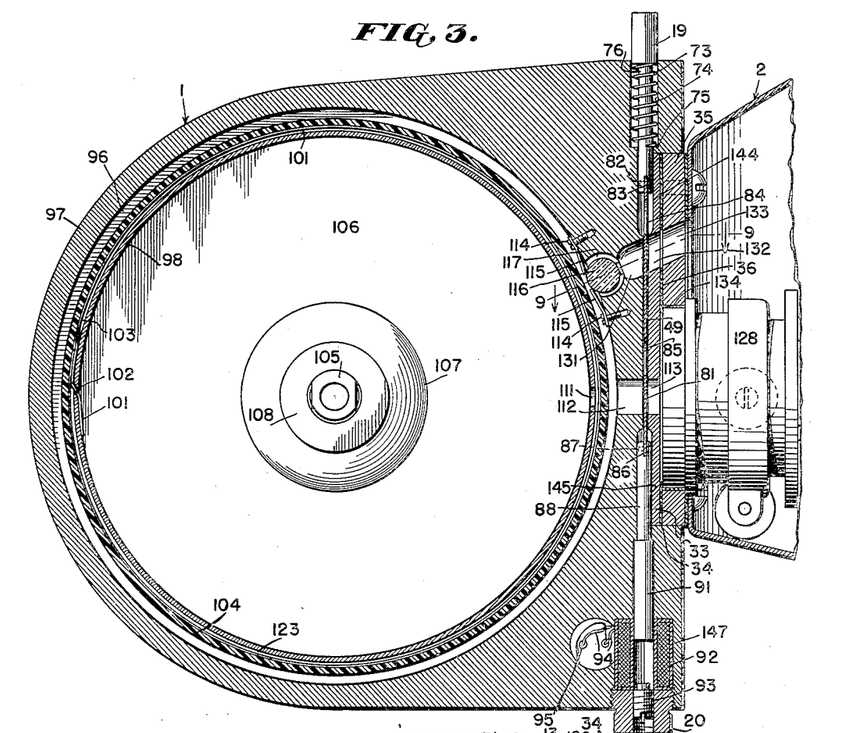
Fig. 3 is an enlarged sectional view along the line 3—3 of Fig. 2.
Figure 4:
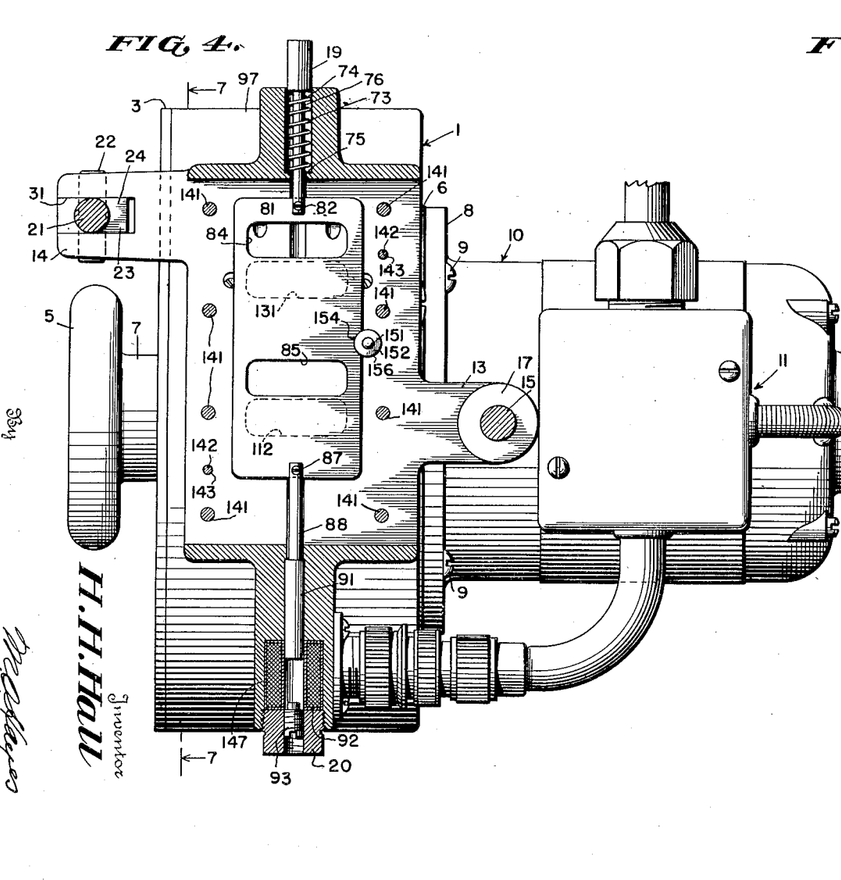
Fig. 4 is an enlarged sectional view along the line 4—4 of Fig. 1.

The camera 1, Figs. 1 and 4, is provided with a flat, recessed face with a face plate 33 adapted to receive the face plate 35 of the hood 2, Fig. 1, the thin gasket 34 of relatively soft, opaque material being provided between the face plates to insure a light-proof joint, the face plate 35 being fixed to the hood 2 in any convenient manner, as by screws, Fig. 3, and having between the hood and face plate the light-proof gasket 36. It is observed, then, that the bolts 15 and 21 with their associated nuts 18 and 25 respectively provide means whereby the camera 1 is firmly held in position on the hood 2.

Figure 2:
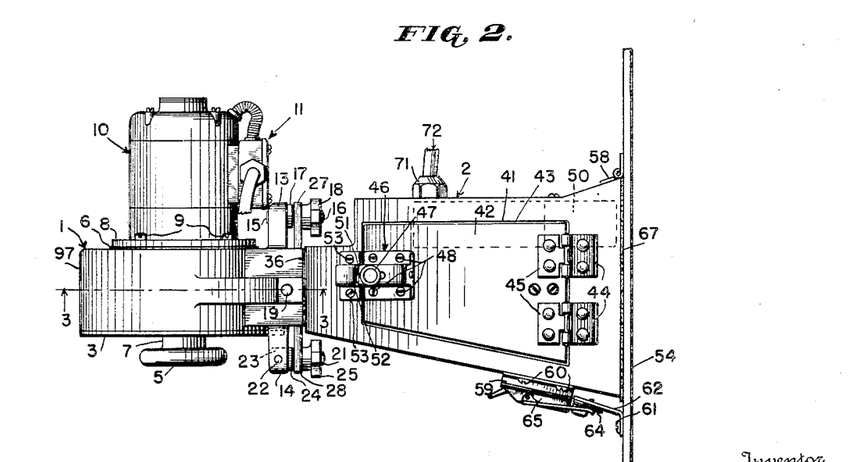
Fig. 2 is a general plan view of the camera and hood.

The hood 2, Fig. 2, has in the top side thereof an opening 41 having a flange 43 around the sides thereof to receive a cover plate 42, with a gasket of soft opaque material, not visible, between them, the cover plate being yieldably fixed to the hood 2 as by hinges 44 and 45, the cover plate having at one end a latch generally designated by the numeral 46, the latch being fixed to the cover 42 as by screws 48, and having a latch member 51 operatively connected to the control knob 47 and adapted to be moved into locking engagement with a keeper 52 held to the main body of the hood 2 as by screws 53. The cover plate 42 is provided to permit easy access to the interior of the hood 2, to permit adjustment of any mechanism therein, the contents of the hood to be more fully explained subsequently.

The hood 2 is adapted to be mounted upon a supporting plate 54, for example, a relay rack plate, and is seen, Fig. 2, to be hinged to the plate as by hinges 58 fixed to the hood and the plate by any convenient means, such as screws. The whole hood assembly is, therefore, adapted to swing open, permitting free access to the screen of the cathode ray tube and the contents of the hood. The plate 54 is seen to have fixed thereto as by screws 61 an angle plate 62, having fixed thereon as by screws 63 a pair of catch members 64 adapted to cooperate with a pair of catch members 65 fixed by screws 66 to a mounting plate 59 fixed to hood 2 as by screws 60, the two pairs of catch members permitting the hood, when swung to the position shown in Fig. 2, to be securely held in place. The gasket 67 of relatively soft, opaque material is provided around the edges of the hood to secure a light-proof seal between the hood 2 and plate 54, and a gasket 68 of felt or similar material is provided fixed, as shown, such as by glueing, on the right hand side of plate 54, Fig. 1, near the cathode ray tube for the same purpose, should it be desirable to use a shield with the tube. The plate 54 may have an aperture 89 therein for admitting light rays from a source 37 to the interior of the hood, for reasons to be more fully explained subsequently.

The hood 2 has associated therewith an electrical cable 72 and connector 71, for purposes to be hereafter more fully explained.

The camera 1 is seen, Fig. 1, to have a cover plate 3 for the drum chamber thereof, the cover plate having an internal latch mechanism, Fig. 6, the latch to be more fully explained subsequently, the handle or knob 5 serving to operate the catch mechanism and remove or replace the cover plate, as will be hereafter more fully explained. The camera is also seen, Fig. 2, to have a raised circular ridge or flange 6 on the side thereof for receiving the mounting flange 8 of a motor 10, which may be a synchronous motor of conventional design, the motor being provided for revolving a drum in a manner to be more fully explained subsequently, and being held to the camera by screws 9, electrical connecting means generally designated by the numeral 11 being provided as shown.

A pin 19, Fig. 1, is operatively connected to the camera shutter 81, Fig. 3, and adapted to operate the shutter manually, electrical shutter operating means being also provided, a solenoid 92 for actuating the shutter being disposed in a bore 147 in the body of the camera, closure nut 20 being provided for maintaining the solenoid in a fixed position, the camera shutter and the operation thereof to be subsequently more fully explained.

Reference is made now to Fig. 3, a sectional view through the interior of the camera taken along the line 3—3 of Fig. 2. The camera assembly is revealed to include, among the main elements thereof, a chamber 96 enclosed by wall 97, and having centrally disposed therein a shaft 105 adapted to be revolved by the aforementioned motor 10 and which may be, if desired, an enlarged extension of the motor shaft, the shaft 105 having fixed thereon to rotate therewith in a manner to be subsequently described a cylindrical drum generally designated by the numeral 106, the annular portion or peripheral wall of the drum being identified by the numeral 98. Fig. 6, to which reference is now made, shows with particular clearness the manner in which the drum 106 is secured to the shaft 105 to rotate therewith. The drum 106 has a centrally disposed sleeve 110 formed integral therewith and which serves as a bearing, the bevelled portion 107 providing for reinforced connection between portion 110 and the side wall of the drum. Internally disposed of sleeve 110, which may be of the same material as the drum, for example, a light weight plastic, is a metal bearing sleeve or bushing 118 securely fixed to sleeve 110, bushing 118 having on the end thereof nearest the motor a tooth designed to mesh with tooth 119 of a ring 120 securely fixed to shaft 105 to rotate therewith, meshing of the tooth of bushing 118 with tooth 119 providing for rotating the drum, when nut 108 is turned upon the threaded end 109 of shaft 105 so that the teeth are forced into engagement with each other. The relation of the threads to the direction of motion may be such that the nut 108 is self-locking.

Figure 6:
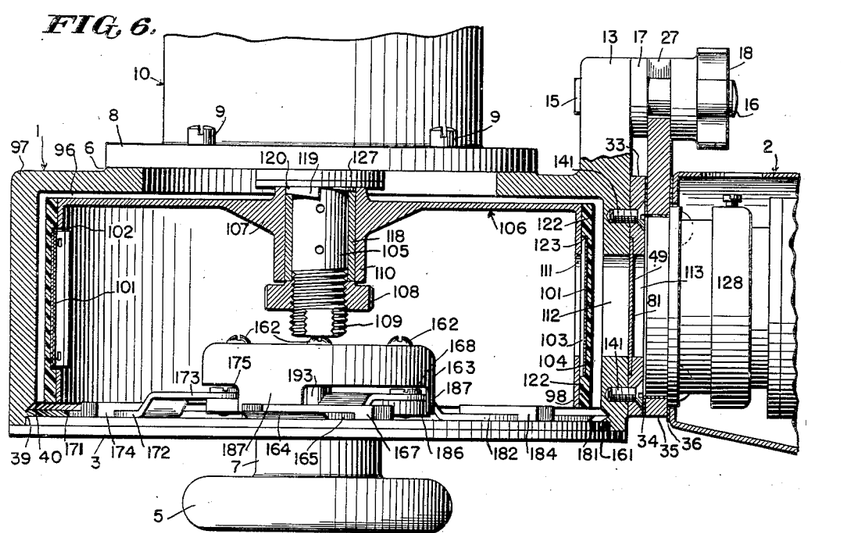
Fig. 6 is a sectional view through the drum and drum housing taken along the line 6—6 of Fig. 1.
Figure 9:
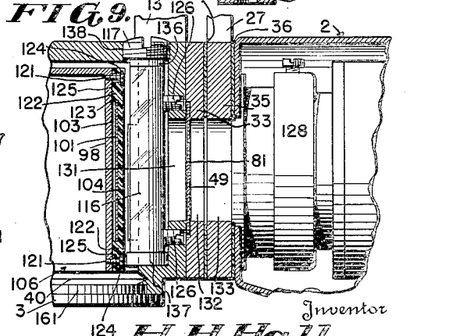
Fig. 9 is a sectional view along the line 9—9 of Fig. 3, showing the cylindrical lens and mounting therefor in greater detail.

The annular portion or peripheral wall 98 of drum 106 is seen, Figs. 6 and 9, to have fixed thereto an annular member or ring 104 of transparent or translucent material, the ring 104 having cut away central portion 123 on the inside thereof so that shoulders 122 thereof provide means for mounting the transparent ring upon the drum with a film space 103 between the outside of the drum and the inside of the transparent ring, the transparent annular member 104 also having, Fig. 9, bores 125 at spaced intervals along the sides thereof for receiving screws 121 which hold the ring securely to the drum, enlarged portions 124 of the bores 125 being provided in the ring 104 so that screws 121 may be countersunk whereby the heads thereof do not extend beyond the outer surface of the ring. The annular surface 98 of the drum is seen, Fig. 3, to have a longitudinal slot 102 disposed therein for inserting film 101, whereby the film may be slipped around the drum in the film space 103 until the film completely surrounds the drum with a slight overlap near the slot if desired. A balancing counterslot 111 may be provided on the opposite side of the drum if desired.

Referring further now to Fig. 3, it is observed that the body of the camera has two optical openings 131 and 112 in the right-hand side wall thereof for admitting the light rays which form on the film 101 the aforementioned secondary and primary images respectively. The openings 131 and 112 are designed to be in registration with openings 132 and 113 respectively in the face plate 33 of the camera when the plate is attached as by screws 141, Fig. 4, the plate 33 to be hereafter more fully described, and aperture 132 is disposed also to register with opening 133 in the face plate 35 of hood 2, whereby an uninterrupted path for light rays is provided. The opening 113 is substantially centrally disposed of a larger opening 134 of hood face plate 35, the larger opening 134 being adapted to receive a lens housing 128 which contains the lens, of any convenient design, for focusing onto the film 101 images of the object, in the application shown the spot of a cathode ray tube, which it is desired to photograph, apertures 112 and 113 providing for uninterrupted passage of the light rays to the film.

Figure 8:
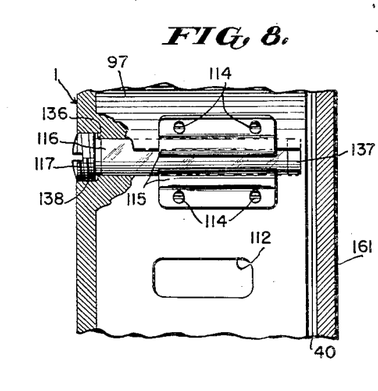
Fig. 8 is a detailed view of the cylindrical secondary lens.

A cylindrical lens 116 is provided, disposed within a portion of the opening 131, for focusing onto the film light rays to form the secondary image, which may be indexing, marking, or timing lines, the light being supplied by a convenient source 37, as will be hereafter explained more fully. The lens 116 is seen, Figs. 3 and 8, to be held in place by flat spring members 115 held fixedly to the wall of the chamber 96 by screws 114. Further details of the mounting of lens 116 are revealed in Fig. 9, to which reference is now made. Spacer washers or pads 136 and 137 are provided for positioning the lens, and closure plug 117 in threaded engagement with a threaded aperture 138 in the side wall of the camera, provides for firmly holding the lens in place, the aperture 138 permitting removal of the lens. Set screws 126 disposed in threaded bores in the camera wall on the sides of opening 131 are provided for changing the position of the lens 116 with respect to the film 101, thereby to provide means for variably focusing the image.

On Fig. 3, taken in conjunction with Fig. 4, are shown details of the camera shutter and associated parts, Fig. 4 showing the camera with face plate 33 removed. The face plate 33 has a rectangular recessed portion 49, Fig. 9, for receiving the shutter 81, and has grooves 144 and 145, Fig. 3, extending vertically therein for permitting free movement of arms 76 and 88 attached to the shutter 81. The upper arm 76 has a slot 83 therein through which the upper end of the shutter passes, being secured therein by pin 82. The arm extends through the bore 74 in the main body of the camera to the aforementioned enlarged head portion or pin 19. Disposed around the arm 76 is a coiled spring 73, which normally abuts with some tension against the bottom of head 19 and against the shoulder 75, the spring tension thereby tending to maintain the shutter in its upper position as shown in Fig. 4.

The aforementioned solenoid 92 is provided for electrically operating the shutter. The lower end of the shutter 81 has associated therewith an arm 88 having an enlarged bottom portion forming a plunger 91, the upper end of arm 88 having slot 86 therein for receiving the lower end of shutter 81, pin 87 securely fixing the arm and shutter together. The face plate 33 has the aforementioned second lower groove 145 therein for permitting free movement of the arm 88. The enlarged bottom portion 91 of the arm is composed of magnetic material and is arranged within the central cavity of the aforementioned solenoid winding 92, whereby energization of the solenoid causes the end of the arm 91 to move downward into the winding, thereby moving the shutter downward against the tension of spring 73. Upon deenergization of the solenoid, the tension of spring 73 causes the shutter to return to its normal upper position. The solenoid 92 is disposed within a large bore 147, the lower end of which is threaded to receive closure nut 20. The nut 20 has a threaded bore therein for receiving threaded stop nut 93, the nut or member 93 controlling the distance travelled by arm 91 when the solenoid is energized, and thereby the distance the shutter travels. Lead wires 94 having terminals 95 provide for bringing an energizing potential to the solenoid.

The normal upper position of the shutter 81 is such, as seen in Fig. 3, that the two lens or optical openings 131 and 112 in the camera wall are normally closed. Energization of the solenoid 92 or pressure downward upon pin 19, if the locking pin 151, Fig. 4, is depressed, results in pulling the shutter downward until it occupies the position shown in Fig. 5, where the shutter openings 84 and 85 register with the face plate openings 132 and 113, and lens openings 131 and 112, respectively.

Locking means including pin 151 is provided to insure against premature opening of the shutter. The head 152 of pin 151 is designed to move in a bore 156 in the side of the camera adjacent the face plate, spring 153 normally urging the head 152 into the position shown in Fig. 10. In such a position, the head 152 is in engagement with the arcuate cut-away portion 154 of the shutter, Fig. 5, thereby preventing movement of the shutter.

Figure 5:
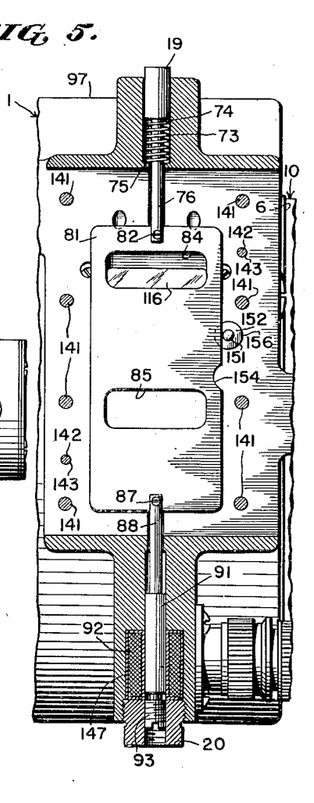
Fig. 5 is a partial view similar to that of Fig. 4 and showing a second position of the shutter.
Figures 10, 11, 12, 13, 14:
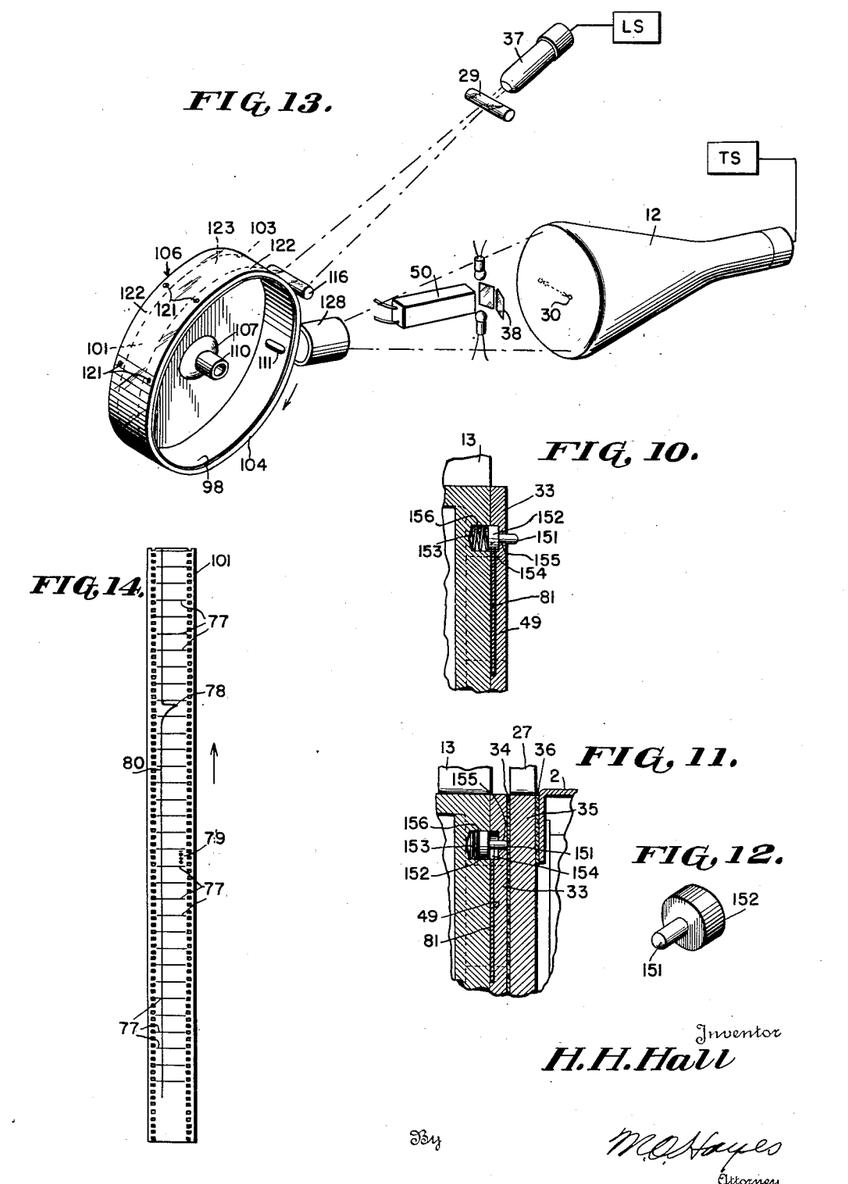
Fig. 10 is a detailed view of the shutter pin and mounting therefor.
Fig. 11 is a detailed view of the same shutter pin as it appears when the hood is attached to the camera.
Fig. 12 is an enlarged view in perspective of the shutter pin.
Fig. 13 is a diagrammatic view of one application of the invention, and shows the camera drum, lenses, marker light, counter, and cathode ray tube.
Fig. 14 is a view of a strip of film showing a typical image recorded thereon.

When the camera is attached to the hood face plate, the pin 151 is pressed inward, as illustrated in Fig. 11, thereby moving the head 152 out of the arcuate notch 154 and releasing the shutter, which may then move to the position shown in Fig. 5 upon energization of the solenoid 92. Fig. 12 shows the shutter pin in perspective.

The wall of the camera adjacent the face plate is also seen, Fig. 4, to have small bores 143 therein adapted to receive pins 142 on the adjacent side of face plate 33, thereby to insure precise and correct positioning of the face plate.

Figure 7:
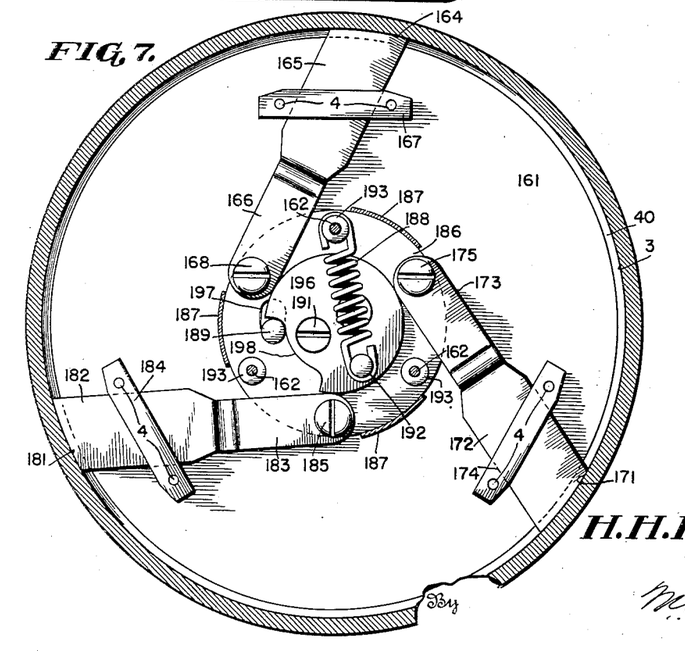
Fig. 7 is a detailed view of the catch mechanism of the cover to the drum housing.

Reference is made now to Figs. 6 and 7, which show details of the latch mechanism for attaching the cover 3 to the body of the camera 1.

The camera 1 is seen, Fig. 6, to have a cutaway portion or annular recess around the border thereof, thereby to provide a shoulder 39. The camera also has an annular groove 40 extending around the inside thereof a small distance from the shoulder 39. The cover 3 has a plate 161 attached thereto and which is designed to fit snugly against the shoulder 39. The cover 3 has a latching mechanism enclosed within the housing 163 having legs 187 and which is attached to the latch mechanism by screws 162, the latching mechanism including three arms 165, 172 and 182 having the ends thereof arranged to provide knife edges 164, 171 and 181 respectively, the edges being adapted to catch in the annular groove 40 when the arms are in extended position, as will be subsequently elaborated, thereby to catch and hold the cover 3 securely to the body of the camera.

The arms 165, 172, and 182 each has associated therewith a guide member 167, 174, and 184 respectively, the guide members being secured to the plate 161 by aforementioned screws 4. Each of the arms 165, 172 and 182 has a reduced portion 166, 173 and 183 respectively having bores in the ends thereof for receiving pivot screws 168, 175 and 185 respectively, whereby the arms are pivotally mounted at spaced intervals upon an actuating plate 186. The bores in arms 165, 182, and 172 are transversely elongated to allow the arms freedom to set accurately in the locking groove. The plate 186 is adapted to slide freely upon plate 161 and has a substantially circular opening in the center thereof, not shown, and a slot 197, with a pin 189 disposed within the slot, the pin being securely attached to the plate 161. Mounted upon the plate 186 and free to move with respect thereto is an actuating cam 196 having a portion 198 cut away as shown, the cam being operatively connected by screws 191 through the aforementioned opening in plate 186 to the shaft 7 of knob 5, whereby rotation of the knob rotates the cam 196. The cam 196 has mounted thereon a pin or stud 192 which has anchored thereabout one end of spring 188, the other end of spring 188 being anchored to a stud 193 attached to plate 186. The studs 193 are attached at spaced intervals around plate 186, and have threaded bores therein for receiving screws 162.

Fig. 7 illustrates the latch with the arms extended in their locking positions. Assume now by way of description that the knob 5 is turned in a clockwise direction, Fig. 7, thereby rotating the cam 196 in a clockwise direction so that the pin 192 attached to cam 196, and to which spring 188 is anchored, is moved beyond the center position over to the left side of the axis of rotation of the cam. The tension of spring 188 now causes the actuating plate 186 to rotate in a counterclockwise direction, the movement being limited by pin 189 which now moves to the opposite end of slot 197 and to the opposite end of cut-away portion 198, the rotation of plate 186 causing arms 165, 172 and 182 to move inwardly in their respective guides 167, 174 and 184, thereby withdrawing the edges 164, 171 and 181 inwardly beyond the edge of plate 161 to their unlatched positions.

Reference is made now to Fig. 13, which shows diagrammatically the elements of a system for employing the hereinbefore described camera apparatus for photographing and measuring the duration of an electrical transient. The aforedescribed drum 98, having translucent annular member 104 and film 101, has disposed in predetermined spaced relation thereto the aforedescribed cylindrical lens 116 and major lens holder 128 containing a lens of any convenient design for focusing an image or images onto the film 101. Disposed in the field of view of the lens of lens holder 128 is the mirror 38 of a counter 50, which may be disposed within the hood 2 and which may be of conventional design, the mirror 38 acting to reflect into the lens an image of the number or other character supplied by the counter, thereby to identify the film and the exposures recorded thereon. Also disposed in the field of view of the lens or lenses of holder 128 is at least a portion of the fluorescent screen of the cathode ray tube 12, arranged to have a horizontal displacement of the spot 30 thereon proportional to the instantaneous value of an electrical transient, for example, the discharge of a condenser, the source of the transient, the accelerating, deflecting, and cathode heating potentials for the cathode ray tube being provided by TS. Whereas no deflecting potential is supplied to one set of plates or coils of the cathode ray tube, so that the spot 30 is shown as moving in one dimension between the limits indicated, it is understood that the linear movement of the film supplies a time base, so that the image recorded thereon is two-dimensional, as shown by the image 78, Fig. 14. The lens of lens holder 128 focuses light rays from spot 30 and from the counter 50 onto the film 101, thereby to produce images for recording thereon.

Disposed also adjacent film 101 is the secondary cylindrical lens 116, adapted to focus light rays from light source 37, which are first concentrated by lens 29, into a relatively narrow line on film 101, thereby to provide marker or indexing lines thereon.

In the operation of the invention, the drum may be rotated at a constant rate. A suitable speed for the application shown is 500 inches per second.

The light source 37 may be intermittent, the period of the rate of luminescence being sufficiently great that a number of flashes occur during the time required for one revolution of the drum.

The light 37 may be a gaseous discharge tube, and the source of energization therefor shown in block form and designated by the letters LS may be an oscillator precisely controlled with respect to frequency, as for example by a 1000 cycle tuning fork, the oscillator having associated therewith, if desired, means for limiting the number of flashes to that required to give one complete series of lines on one revolution of the drum. Or, if desired, the source of energization LS may be a frequency multiplier operatively connected to the alternating current source which drives the synchronous motor 10, whereby the distance between marking lines is so controlled that the lines are supplied to the film at precisely the same spot on each revolution of the drum. The flashes of light source 37 may be synchronized with the appearance of the spot 30, if desired, by conventional means, thereby to insure that the marking lines are made during the same revolution of the drum during which the major image is recorded.

On Fig. 14 is shown a typical film, the lines produced by the flashes of light 37 being designated by the numeral 77, the recorded image produced by movement of spot 30 being shown at 78, and the number supplied by the counter 50 and reflected onto the film by mirror 38 being shown at 79. It is understood that the number 79 is supplied to the film while the drum is stationary.

Fig. 2 shows a portion of the electrical connections of the various electrical devices of Fig. 13, the cable 11 to the motor 10 being shown, and the cable 72 and connector 71 being shown for operatively connecting the counter disposed within the hood to the rest of the system, it being understood that complete electrical connections may be provided for all the electrical elements in accordance with the circuit arrangement of Fig. 13 or any other desired arrangement.

The operation of the system to measure the duration of an electrical transient, for example, a transient having the shape indicated by the recorded image 78, may readily be understood by reference to Figs. 13 and 14. Assume by way of example that the light source 37 flashes 1000 times per second. The distance between adjacent lines 77 on film 101 will then represent a time interval of one millisecond. By comparison of the relative size of the image 78 produced by movement of the spot 30 and the relative distance between lines, the duration of the transient is easily obtained. In the example shown in Fig. 14, the image 78, which is typical of the pressure curve of an explosive charge, is seen to last approximately 1 millisecond. It may also be seen that it decays to one-half its peak value in approximately five-tenths of a millisecond. The base line 80 on the left hand side of the film 101 in Fig. 14 may result from the spot 30 maintaining a fixed position on the screen of the cathode ray tube in the absence of a deflecting potential on the horizontal deflection plates.

Any suitable cathode ray tube having a short persistence screen may be used. In the apparatus described, a brilliance of the spot on the screen considerably below maximum is still sufficient for production of a clear and adequate image on the film.

The invention may be employed for photographing steady state wave forms, the wave form being applied to the horizontal deflecting plates of the cathode ray tube in conventional fashion, suitable means being provided for turning on the beam for a brief instant at least as long as the time period of one complete cycle of the waveform to be studied, the drum being revolved at suitable speed.

Whereas in the embodiment shown and described the drum is composed of opaque material and the annular member of translucent material is disposed external thereto, in another embodiment the drum may be of translucent material, and a film-supporting annular member be disposed internal to the drum.

Whereas the drum and film have been shown and described as revolving at constant speed, they could, in another embodiment of the invention, be revolved at other than constant speed, for example, at a speed which would supply a logarithmic time base for the recorded image, suitable driving means being provided.

The word "film" as used herein, is defined as any light-sensitive material suitable for recording an image thereon.

Whereas in the embodiment described, a single cathode ray tube is shown having the beam thereof moving in accordance with variations in a single signal, it is of course understood that several signals may be simultaneously recorded on the film by the use of several oscilloscope tubes each occupying a portion of the field of view of the lens, or successively by applying the signals successively to the deflection plates of the cathode ray tube shown.

Whereas the invention has been described herein with reference to a preferred embodiment which gives satisfactory results, it will be understood by those skilled in the art to which the invention pertains, after understanding the invention, that various modifications of form or structure may be made without departing from the spirit or scope of the invention, and it is therefore intended to include all such modifications and equivalents, mechanical, electrical and optical, and that the invention be limited only by the appended claims.

The invention herein described and claimed may be manufactured and used by or for the Government of the United States without payment of any royalty thereon or therefor.

What is claimed as new and desired to be secured by Letters Patent of the United States is:

1. A high speed camera comprising a casing having as least one optical opening, a lens adjacent said opening, film carrying means comprising a cylindrical drum rotatably mounted in said casing and adapted to carry a film strip adjacent the periphery thereof, means for rotating said drum and thereby continuously moving said film past said lens substantially tangent to the image plane thereof, means for retaining said film strip adjacent the periphery of said drum comprising a translucent annular member fixed on said drum in spaced relation thereto, whereby said film may be inserted between said drum and said member, said drum being positioned a predetermined distance with respect to said lens whereby the film is always substantially tangent to the image plane as the drum rotates.

2. A high speed camera comprising a casing, a cylindrical drum rotatably mounted in said casing and adapted to carry a film strip adjacent the outer cylindrical surface thereof, means for retaining said film strip adjacent the periphery of said drum comprising an annular retaining member of translucent material having a width at least as great as the width of said film strip and being rigidly mounted upon the outer cylindrical surface of said drum, said annular retaining member being spaced from said cylindrical surface to permit the insertion of said film strip therebetween whereby said film strip is supported over its entire area by the inner surface of said annular retaining member.

3. A high speed camera comprising a casing having at least one optical opening, a lens adjacent said opening, film carrying means comprising a cylindrical drum rotatably mounted in said casing, and adapted to carry a film strip adjacent the periphery thereof, means for continuously rotating said drum thereby continuously moving said film past said lens substantially tangent to the image plane thereof, the periphery of said drum comprising two annular members of slightly different diameter disposed in predetermined concentric position with respect to one another and adapted to be rotated together, the outer one of said annular members being composed of translucent material, said annular members being spaced apart to permit insertion of said film strip therebetween, said drum being positioned with respect to said lens whereby the film carried thereby always passes tangentially to the image plane of the lens as the drum rotates.

4. A high speed camera comprising a casing, a cylindrical drum rotatably mounted in said casing and adapted to carry a film strip adjacent the periphery thereof, said drum comprising two peripheral annular members disposed concentric to each other and spaced a predetermined distance apart to permit insertion of said film strip therebetween, the outer of said members being of translucent material and of a width at least as great as said film strip whereby said film strip is supported over its entire area by the inner surface of said outer translucent annular member.

5. Camera apparatus comprising, in combination, a camera casing having a drum chamber therein and having at least one optical aperture in said casing communicating with said chamber, at least one lens mounted in predetermined position with respect to said optical aperture, a rotatable shaft journalled for rotation in a wall of said casing, means operatively connected to said shaft for rotating the shaft at a predetermined speed, a hollow drum mounted within said chamber and detachably secured upon said shaft to rotate with the shaft, said drum being adapted to carry a film strip adjacent the outer periphery thereof, said drum comprising two peripheral annular members concentrically disposed with respect to one another and spaced apart to permit insertion of said film strip therebetween, the outer of said members being of translucent material and of a width at least as great as the width of said film strip whereby the film strip is supported over its entire area by the inner surface of said outer translucent annular member, the inner of said annular members having at least one slot therein to permit insertion of said film strip between said members, said drum being open at one end to permit access to the hollow interior thereof, means accessible from the open end of said drum for detaching said drum from said shaft, said drum being disposed in predetermined position with respect to said lens whereby the film moves substantially tangentially to the focal plane of the lens, said chamber having an opening for placing said drum within the chamber and removing the drum therefrom, said opening in said chamber being disposed opposite the open end of said drum thus permitting access to the interior of said drum, and a lightproof closure member for said opening.

6. A high speed camera comprising a cylindrical drum adapted to carry a film strip adjacent the periphery thereof, means for rotating said drum, an annular translucent retaining member carried by said drum on the outer periphery thereof having a width at least as great as the width of said film strip, the inner surface of said annular member being adapted to support said film strip over its entire area, whereby centrifugal force acting on said film strip on rotation of said drum forces said film strip securely against the inner surface of said translucent annular retaining member.

7. A high speed camera comprising a casing, a hollow cylindrical drum rotatably mounted in said casing and adapted to carry a film strip adjacent the outer cylindrical surface thereof, said drum comprising two annular members concentrically disposed, and spaced apart to permit insertion of said film strip therebetween, the outer of said members being of translucent material, and of a width at least as great as the width of said film strip whereby said film strip is supported over its entire area by the inner surface of said outer translucent annular member, the inner of said annular members having at least one slot therein to permit insertion of said film strip between said members, the hollow interior of said drum being accessible from one side of said drum.

8. A high speed camera comprising a casing, a primary optical opening in said casing, a secondary optical opening in said casing, film carrying means comprising a cylindrical drum rotatably mounted in said casing and adapted to carry a film strip adjacent the periphery thereof, said drum comprising two annular members concentrically disposed with respect to each other and spaced apart to permit insertion of said film strip therebetween, means for rotating said drum and thereby continuously moving said film past said optical openings at a predetermined speed, a primary lens opposite said primary optical opening and adapted to focus onto said film strip images of objects to be photographed, means associated with said secondary opening for producing on said film strip spaced markings, said last named means comprising an intermittently operated light source.

9. A high speed camera comprising a casing having at least one optical opening, film carrying means comprising a hollow cylindrical drum rotatably mounted in said casing and adapted to carry a film strip adjacent the periphery thereof, said drum comprising two peripheral annular members concentrically disposed in respect to one another and spaced a predetermined distance apart to permit insertion of said film strip therebetween, the outer of said members being of translucent material and of a width at least as great as the width of said film strip whereby said film strip is supported over its entire area by the inner surface of said translucent annular member, means for rotating said drum thereby moving said film strip past said optical opening at a predetermined speed, the inner one of said annular members having at least one slot therein to permit insertion of said film strip between said annular members, said drum being open at one end to permit access to the hollow interior thereof, an opening in said casing opposite the open end of said drum to permit access thereto, and a lightproof closure for said opening.

10. A high speed camera comprising a casing, a chamber within said casing, a primary optical opening in one face of said casing communicating with said chamber, a secondary optical opening adjacent said primary optical opening in the same face of said casing and communicating with said chamber, film carrying means comprising a cylindrical drum rotatably mounted in said chamber and adapted to carry a film strip adjacent the periphery thereof, said drum comprising two annular members concentrically disposed with respect to each other and spaced apart to permit insertion of said film strip therebetween, means for rotating said drum and thereby continuously moving said film strip past said optical openings at a predetermined speed, a primary lens opposite said primary optical opening and adapted to focus onto said film strip images of objects to be photographed, means associated with said secondary opening for producing on said film strip spaced markings, said last named means comprising an intermittently operated light source, shutter means embodied in the same face of said casing as said optical openings are located, apertures in said shutter so spaced that said apertures simultaneously register with said optical openings.

11. A high speed camera suitable for recording the indication on the screen of a cathode ray oscilloscope comprising a casing having a primary and a secondary optical opening in one face thereof, a chamber within said casing communicating with both of said openings, a cylindrical drum rotatably mounted in said chamber and adapted to carry a film strip adjacent the periphery thereof, said drum comprising two annular members concentrically disposed with respect to each other and spaced apart to permit insertion of said film strip therebetween, means for rotating said drum and thereby continuously moving said film strip past said openings at a predetermined speed, a hood attached to the face of said casing adjacent said optical openings, said hood forming a lightproof chamber between said optical openings and the screen of a cathode ray oscilloscope, a primary lens adjacent said primary optical opening adapted to focus luminous indications from said screen on said film strip, means associated with said secondary optical opening for producing spaced markings on said film strip, said last mentioned means comprising an intermittently operated light source.

HARRY H. HALL.

REFERENCES CITED

The following references are of record in the file of this patent:

UNITED STATES PATENTS

| Number | Name | Date |
| --- | --- | --- |
| 1,406,973 | Carter | Feb. 21, 1922 |
| 1,545,897 | Haynes | July 14, 1925 |
| 1,578,842 | Mitchell | Mar. 30, 1926 |
| 1,791,207 | Hindle | Feb. 3, 1931 |
| 1,871,379 | Legg | Aug. 9, 1932 |
| 1,991,814 | Mitchell | Feb. 19, 1935 |
| 2,102,708 | Howle | Dec. 21, 1937 |
| 2,184,953 | Bryan | Dec. 26, 1939 |
| 2,185,373 | George | Jan. 2, 1940 |
| 2,238,379 | Tiffany | Apr. 15, 1941 |
| 2,304,901 | Eisler | Dec. 15, 1942 |
| 2,348,401 | Manzanera | May 9, 1944 |
| 2,403,730 | MacNeille | July 9, 1946 |